United States Patent [19]

Gentet et al.

[11] Patent Number: 4,609,957
[45] Date of Patent: Sep. 2, 1986

[54] MAGNETIC CARD READER-ENCODER APPARATUS

[75] Inventors: Michel Gentet, Valence; André Nicolet, Portes les Valance, both of France

[73] Assignee: Crouzet, Paris, France

[21] Appl. No.: 462,780

[22] Filed: Feb. 1, 1983

[30] Foreign Application Priority Data

Feb. 15, 1982 [FR] France .................................. 82 02549

[51] Int. Cl.⁴ ........................ G11B 25/04; G11B 21/18
[52] U.S. Cl. ......................................... 360/101; 360/2; 360/104; 360/107
[58] Field of Search ...................... 360/2, 81, 101, 104, 360/105, 107, 76, 106, 109; 235/449, 480; 434/311, 312; 310/12-13; 74/89.2

[56] References Cited

U.S. PATENT DOCUMENTS

| | | | |
|---|---|---|---|
| 3,578,337 | 5/1971 | Klein ................................... | 360/101 |
| 3,665,163 | 5/1972 | Mast et al. ........................... | 360/101 |
| 3,859,662 | 1/1975 | Habich et al. ....................... | 360/106 |
| 3,978,522 | 8/1976 | Rothlisberger et al. ............ | 360/104 |
| 4,151,564 | 4/1979 | Schreiber et al. ................... | 360/101 |
| 4,305,104 | 12/1981 | Donohue ............................. | 360/106 |
| 4,375,071 | 2/1983 | Crowley et al. .................... | 360/104 |

FOREIGN PATENT DOCUMENTS 2041626 9/1980 United Kingdom ............... 360/109

OTHER PUBLICATIONS

T. A. Hickox, "Head Mount", IBM Tech. Disc. Bull., Jul. 1975, vol. 18, No. 2, p. 541.
S. R. Ingram, "Spherical Mount for Magnetic Head", IBM Tech. Disc. Bull., Feb. 1975, vol. 17, No. 9, pp. 2572-2573.

*Primary Examiner*—John H. Wolff
*Assistant Examiner*—David J. Severin
*Attorney, Agent, or Firm*—Holman & Stern

[57] ABSTRACT

The invention relates to a reader-encoder of an magnetic card, which comprises means for maintaining the support in a fixed and well determined position in contact with read-write means disposed on a carriage moving in a uniform rectilinear movement. It comprises means for orienting the read-write means with respect to the magnetic track of the support and drive means associated with two transmission belts, one elastic, the other rigid. The reader-encoder is employed for magnetic cards used in banks.

4 Claims, 1 Drawing Figure

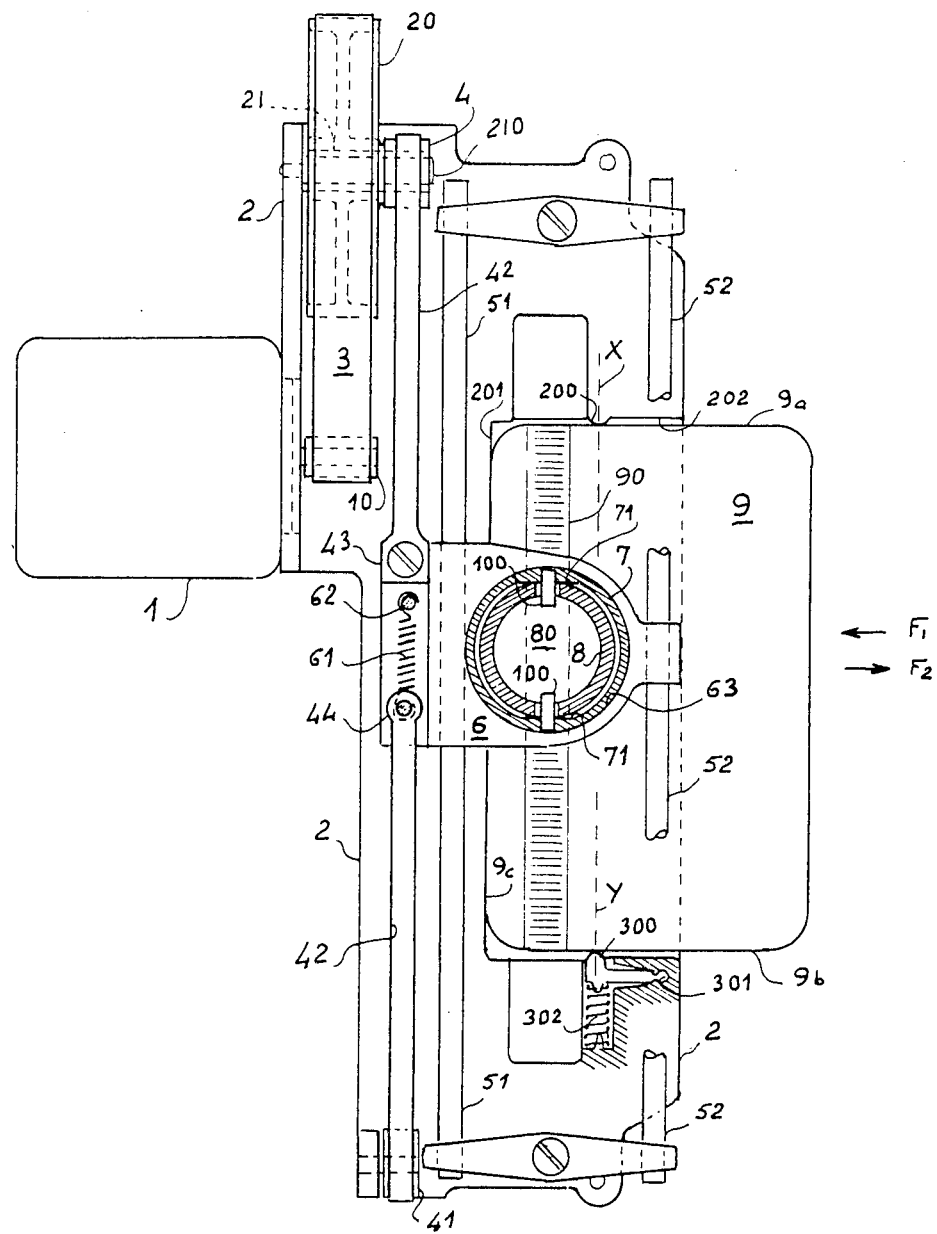

MAGNETIC CARD READER-ENCODER APPARATUS

BACKGROUND OF THE INVENTION

The present invention relates to a reader-encoder of magnetic cards provided with a magnetizable track, comprising means for maintaining one such support in a determined position in contact with magnetic read-write means, and means for displacing a uniform rectilinear movement the read-write means along the magnetizable track of the information carrying support.

In rigid or semi-rigid magnetic card reader-encoders of this type, such as for example those used in banking transactions, the information is encoded magnetically on at least one magnetic track disposed to this end on one face of the card. The read-write means consist in known manner of a magnetic head which may either by fixed, or mobile. It is fixed in the case of "Swallowing" encoders in which the card moves with respect to the encoding means, or mobile in those encoders where the card is simply introduced into a slot and is recovered by the user after exploitation thereof.

The device according to the invention is included in the latter category. For the system to be reliable and in accordance with certain standards concerning the coding of credit cards, the relative speed of displacement between the magnetic head and the track must be linear and uniform with instantaneous variations less than 5%.

To filter the vibrations due to the drive motor, it is known, such as for example in record player decks, to connect the pulley of the motor to a first gear-down pulley, greater in diameter, by means of an elastic belt. However, the known devices, whether they be with gears, notched belts or endless screws, do not enable the standards in question to be respected and require devices for making up for mechanical clearances, which renders them complex and expensive.

It is an object of the device according to the invention to avoid these drawbacks whilst ensuring an instantaneous variation in speed, at carriage level, which does not go beyond 1.5%.

SUMMARY OF THE INVENTION

To this end, the present invention relates to a reader-encoder of the above specified type, characterized in that the means of displacing the read-write means comprise a carriage mounted to slide along two parallel rods fast with a frame, a motor for driving the carriage, mounted on the frame, a first elastic transmission belt driven by the motor, adapted to filter the vibrations of the motor, and a second rigid belt driven by the first belt and adapted to drive the carriage via a tension spring.

In a preferred embodiment of the invention, the particular assembly of the magnetic head on the carriage is such that an intimate contact of said head on the magnetic track is obtained, whatever the defects in inherent flatness of the support used. This assembly makes it possible for the head to oscillate about an axis parallel to the axis of the magnetic track and to move in elastic translation perpendicularly to the plane of the support. In addition, the head may pivot in the carriage about an axis perpendicular to the plane of the magnetic track, which makes it possible to adjust the azimuth, i.e. the angular position of the air gap of the magnetic head with respect to the longitudinal axis of the track.

To ensure that the magnetic card, once introduced manually into a slot in the frame of the reader, remains in abutment without force on its reference side at the bottom of said slot, the length of this slot may be greater than this reference side and the support is pushed by a presser lever, in a direction parallel to the track, against a fixed element in relief, in rounded form, to have a punctual contact.

The points of abutment of the element in relief and of the presser lever on the support are then located on a common axis parallel to the bottom of the slot and hold the support in place by simple friction. To this end, the presser lever is elastic in the direction of the track but perfectly rigid in the direction of introduction of the support. The slightest elasticity of the presser in the direction of introduction would cause automatic withdrawal of the support by a few hundredths to a few tenths of millimeter, which would be detrimental to correct encoding of the magnetic track.

BRIEF DESCRIPTION OF THE DRAWINGS

The invention will be more readily understood on reading the following description with reference to the accompanying drawings, in which:

The single FIGURE shows an embodiment of the device according to the present invention.

DESCRIPTION OF A PREFERRED EMBODIMENT OF THE INVENTION

Referring now to the drawings, the reader-encoder, for example for credit cards for bank use, consists in a frame 2 cast in metallic alloy such as the alloy known under the registered trademark "Zamac". This frame serves as rigid support for two parallel rods 51 and 52, pulleys 4, 41 and 20 as well as for a drive motor 1. The two parallel rods 51, 52 are made of rolled stainless steel and serve as guide for a carriage 6, cast in plastic material such as the material known under the registered trademark "Rilsan" reinforced with glass beads in order to obtain a good coefficient of friction and to facilitate uniformity of its slide on the rods. This carriage is driven in a uniform rectilinear movement over the guide rods 51, 52 by means of the electric motor 1, preferably a D.C. motor, with low inertia for starting and stopping quickly, and at a reduced voltage in order to rotate relatively slowly—1700 revs/min—and thus avoid too great a reduction ratio between the pulley 10 of the motor and a first pulley 20. This pulley 20 is fast with a second pulley 4 with it constitutes a single mobile which rotates on a spindle 210, fast with the frame, via a self-lubricating ring 21 in order to avoid the vibrations which may be generated by the use of ball bearings. A third pulley 41, whose diameter is identical to that of the pulley 4, serves as guide for a first metal transmission belt 42 fixed on the carriage. This belt 42, for example made of spring steel, has no elasticity lengthwise. Its end 43 is directly fixed on the carriage by a screw whilst its other end 44 is also fixed on the carriage but via a tension spring 61, hooked to a stud 62 fast with the carriage. This spring exerts on the metal belt 42 a tension of the order of 1000 to 1500 g-force. The longitudinal rigidity of this belt maintained under tension by the spring 61 makes it possible to drive the carriage 6, supporting a magnetic read-write head 80, at a strictly uniform speed, 150 mm/second in the example in question. Only the second transmission belt 3, connecting the drive pulley 10 of small diameter to the pulley 20, rotates relatively quickly. The reduction ratio between these two pulleys is of the order of 1 to 7 and the belt 3 is made of elastic material, for example rubber such as currently used for record-player belts, so as to dampen and absorb the vibrations due to the motor 1. The drive of carriage 6 by the combination of a first elastic belt, circulating at high speed, with a second metal belt, or a steel cable, circulating at reduced speed, makes it possible to obtain a uniform movement of rectilinear translation with no linear vibrations. The carriage 6 comprises a cylindrical through housing opening on either side thereof, disposed perpendicularly above the axis of the magnetic track 90 of a card 9 when the latter is engaged in the direction of arrow $F_1$ into a slot 202 in the frame 2, so that its reference side $9_c$ is in abutment on the bottom 201 of the slot 202. The magnetic head 80 is fitted in a cylindrical ring 8. It may move in translation inside this ring under the effect of a spring in order to be able to slide at constant pressure on the surface of the card, even if the latter is deformed. To this end, the magnetic heads are provided with two diametrical longitudinal grooves.

This ring 8 is introduced into a second cylindrical ring 7 whose inner diameter, larger than the outer diameter of ring 8, comprises two diametrically opposite parallel flat portions 71. Ring 8 is fitted between these two flat portions and may pivot freely about the axis of two pins 100, driven by force in the ring 7. To avoid the double bearing surfaces, the pins 100 pass with clearance through the ring 8 and are fitted only in the grooves of the magnetic head which may thus move in translation.

The diametrical clearance between the rings 7 and 8 enables the magnetic head to oscillate about the axis of the two pins 100 which, by construction, is parallel to the longitudinal axis of the track 90. The magnetic head 80 may therefore move in translation along an axis perpendicular to the track 90 and oscillate about an axis parallel to this track, which enables it to remain in contact with the track even if the card is deformed.

Finally, the ring 7 may rotate in its cylindrical housing 63 and may be oriented by means of two micrometric screws (not shown), disposed on either side of a diametrical outer projection (not shown) fast with this ring, which screw in two nuts which are fixed with respect to the frame.

This arrangement makes it possible to orient the magnetic head in azimuth. The information carrying card 9 is introduced into slot 202, then withdrawn manually after exploitation thereof, in the direction of arrows $F_1$ and $F_2$ respectively. The bottom 201 of this slot 202 serves as bearing for side $9_c$ of the card, parallel to the magnetic track 90. This bottom 201 is, by construction, strictly parallel to the two guide rods 51, 52, so that the carriage 6 also moves parallel to the magnetic track. The side $9_c$ being taken as reference, and to overcome the defects in orientation of the other sides $9_a$ and $9_b$ of the card as well as possible, the slot 202 is larger than the length of side $9_c$.

A lever 300 hinged about a spindle 301 bears, under the action of a compression spring 302, on the side $9_b$ of the card which is thus pressed, by its opposite side, on a rounded element in relief 200 on the frame. The X and Y axes of the relief element 200 and the active part of lever 300, respectively, merge and are parallel to the bottom 201 of the slot so that no rocking torque is transmitted to the card which thus remains perfectly in abutment on the bottom of the slot.

The device according to the invention enables magnetic card read-encoders to be produced, incorporating simple, reliable mechanical means.

What is claimed is:

1. A magnetic card reader-encoder apparatus, comprising:
    a magnetic read-write means;
    a means for maintaining a magnetic card in a determined position in contact with said magnetic read-write means;
    means for displacing in a uniform rectilinear movement said read-write means along a magnetizable track of said magnetic card;
    a frame;
    two parallel rods secured to said frame;
    a first pulley;
    wherein said means for displacing said read-write means comprises a carriage mounted to slide along said two parallel rods secured to said frame;
    a motor, mounted on said frame for driving said carriage;
    first longitudinally elastic transmission belt means driven by said motor for filtering vibrations of said motor and driving said first pulley;
    second longitudinally inelastic transmission belt means;
    a second pulley, having a diameter smaller than the diameter of said first pulley and driven by said first pulley, for driving said second transmission belt means; and
    tension spring means on said second transmission belt means for driving said carriage.

2. The magnetic card reader-encoder apparatus according to claim 1 in which said read-write means comprise:
    a magnetic head mounted to slide in a first cylindrical ring, said first ring being mounted between two parallel planes formed in an inner bore of a second cylindrical ring and adapted to oscillate about a diametric axis, parallel to an axis of said magnetizable track, said second ring being maintained in a cylindrical recess defined in the carriage and having an axis perpendicular to said axis of said track when said magnetic card is in abutment against the bottom of a slot made in said frame.

3. The magnetic card reader-encoder apparatus according to claim 2 wherein said second ring is adapted to pivot with respect to said carriage about its axis of revolution by means of two micrometric screws disposed on either side of a projection secured to said second ring.

4. The magnetic card reader-encoder apparatus according to claim 1 wherein said slot is longer than the dimension of said magnetic card parallel to said track to maintain said magnetic card in abutment on the bottom of said slot and on an element in relief made on one side of said slot, under the effect of a lever subjected to the action of a compression spring, the points of abutment of said lever and said relief element on said magnetic card being located on an axis parallel to the bottom of said slot.

* * * * *